US010889254B2

(12) United States Patent
Odate (10) Patent No.: US 10,889,254 B2
(45) Date of Patent: Jan. 12, 2021

(54) STEERING WHEEL UNIT (71) Applicant: HONDA MOTOR CO., LTD., Tokyo (JP)

(72) Inventor: Shotaro Odate, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 43 days.

(21) Appl. No.: 16/344,596

(22) PCT Filed: Sep. 11, 2017

(86) PCT No.: PCT/JP2017/032613
§ 371 (c)(1),
(2) Date: Apr. 24, 2019

(87) PCT Pub. No.: WO2018/079096
PCT Pub. Date: May 3, 2018

(65) Prior Publication Data
US 2020/0055468 A1    Feb. 20, 2020

(30) Foreign Application Priority Data

Oct. 28, 2016 (JP) .................................. 2016-212305

(51) Int. Cl.
B60R 16/027 (2006.01)
B62D 1/06 (2006.01)

(52) U.S. Cl.
CPC ............. B60R 16/027 (2013.01); B62D 1/06 (2013.01)

(58) Field of Classification Search
CPC .... G01D 5/2233; G01D 5/2448; G01D 5/264; G01D 5/268; G01R 33/09; G01R 33/098; G01L 5/221; G01L 5/0061; G01N 15/05

(Continued)

(56) References Cited

U.S. PATENT DOCUMENTS

2011/0272131 A1* 11/2011 Mikat ................ B60H 1/00742
165/202
2014/0224040 A1* 8/2014 Van'tZelfde .............. G01L 1/00
73/862.381

(Continued)

FOREIGN PATENT DOCUMENTS

JP    2015-131544 A    7/2015
JP    2015-147531 A    8/2015

(Continued)

OTHER PUBLICATIONS

PCT/ISA/210 from International application PCT/JP2017/032613 and the English translation thereof.

Primary Examiner — Melissa J Koval
Assistant Examiner — Trung Nguyen
(74) Attorney, Agent, or Firm — Carrier Blackman & Associates, P.C.; Joseph P. Carrier; Jeffery T Gedeon (57) ABSTRACT Provided is a steering wheel unit with which misdetections due to contact between a steering wheel and the thigh part of the legs of an overweight person can be avoided, and gripping (contact) by a hand can be accurately detected. In a contact sensor, the contact sensitivity [pF/mm$^2$] of a prescribed area (an area including a blank portion on the side of a rim part of the steering wheel that is near a seat surface of a driver's seat when the vehicle is in a straight traveling state is set to be lower than the contact sensitivity of another area (an area comprising only a conductive part) of the rim part.

3 Claims, 8 Drawing Sheets (58) Field of Classification Search
USPC ........ 324/219–252, 200, 207.2–207.24, 500,
324/529–530, 750.12, 750.21, 754.17,
324/754.29, 699; 73/514.31, 514.39,
73/520.01, 779, 862.193, 862.333
See application file for complete search history.

(56) References Cited

U.S. PATENT DOCUMENTS

| | | |
|---|---|---|
| 2015/0369633 A1 | 12/2015 | Karasawa et al. |
| 2017/0166236 A1 | 6/2017 | Iguchi et al. |
| 2017/0210408 A1 | 7/2017 | Okazaki et al. |

FOREIGN PATENT DOCUMENTS

| | | |
|---|---|---|
| JP | 2015-229417 A | 12/2015 |
| JP | 5947919 B2 | 7/2016 |
| JP | 2016-165940 A | 9/2016 |
| WO | 2016/009584 A1 | 1/2016 |

* cited by examiner

STEERING WHEEL UNIT

TECHNICAL FIELD

The present invention relates to steering wheel units including contact sensors configured to detect occupants' grips on rim portions of steering wheels with their hands, and relates to steering wheel units preferably applied to, for example, self-driving vehicles (in this description, including self-driving assist vehicles) and the like.

BACKGROUND ART

Some of the self-driving vehicles that have been proposed allow some functions, for example, a lane keeping assist system LKAS (Lane Keeping Assist System) configured to supplement steering torque for a driver to travel along lanes, to be performed or continued under the condition that the driver's hands are gripping the steering wheel.

In such a self-driving vehicle, a contact sensor (detection sensor) configured to detect contact of an occupant with a steering wheel is provided for the steering wheel.

Japanese Laid-Open Patent Publication No. 2015-147531 (hereinafter referred to as "JP 2015-147531 A") discloses a steering system provided with a capacitive sensor serving as a contact sensor disposed over the substantially entire circumference in the circumferential direction of a rim portion of a steering wheel or in a circumferential part except for a lower part of the rim portion (FIG. 1 and [0013] in JP 2015-147531 A).

SUMMARY OF INVENTION

However, in a steering wheel unit provided with a capacitive sensor serving as a detection sensor disposed over the substantially entire circumference in the circumferential direction of a rim portion, there is a high possibility of false detection that driver's hands are gripping the steering wheel even when the abdominal part or the femoral part in the lower limb of a so-called obese person (fat man) is in contact with a lower part of the rim portion.

Moreover, in the steering wheel unit provided with the capacitive sensor in a circumferential part except for the lower part of the rim portion, it is falsely detected that the driver's hands are not in contact with the steering wheel even when the driver's hands are gripping the lower part where no capacitive sensor is formed.

The present invention has been devised taking into consideration the aforementioned problems, and has the object of providing a steering wheel unit enabling reliable detection of a driver's grip (contact) on the steering wheel with their hands while avoiding false detection based on contact of an abdominal part or a femoral part in the lower limb of a so-called obese person with a rim portion.

A steering wheel unit according to the present invention comprises a contact sensor configured to detect contact of an occupant with a rim portion of a steering wheel of a vehicle; wherein the contact sensor includes a reduced contact sensitivity part in a region of the rim portion of the steering wheel adjacent to a seating surface of a driver's seat when the vehicle is traveling straight, a contact sensitivity of the reduced contact sensitivity part being lower than a contact sensitivity in a remaining region of the rim portion.

According to the present invention, the contact sensitivity (capacitance [$pF/mm^2$] per unit contact area against an electrode surface) in the region of the rim portion of the steering wheel adjacent to the seating surface of the driver's seat when the vehicle is traveling straight is lower than the contact sensitivity in the remaining region of the rim portion. Thus, even when the abdominal part or the femoral part in the lower limb of the obese person comes into contact with the region with the low contact sensitivity, the value of a contact signal does not exceed a threshold, and false detection that the occupant is in contact with the steering wheel is avoided. On the other hand, the threshold can be set such that the value of the contact signal exceeds the threshold when the occupant grips the region with low contact sensitivity with their hands. Thus, it can be reliably detected that their hands are in contact or not in contact with the steering wheel.

The reduced contact sensitivity part may be a region located adjacent to a lower end of the steering wheel when the vehicle is traveling straight.

In this manner, the reduced contact sensitivity part serving as the region with relatively lowered contact sensitivity is the region adjacent to the lower end of the steering wheel, which is possibly brought into contact with the abdominal part or the femoral part in the lower limb of the obese person, when the vehicle is traveling straight. Thus, false detection will not occur even when the abdominal part or the femoral part in the lower limb of the obese person comes into contact with the region.

Here, the contact sensor may be a capacitive sensor including an electrode surface formed in a circumferential direction of the rim portion of the steering wheel, and part of the electrode surface in the reduced contact sensitivity part may be formed into a non-conductive part.

In this manner, the capacitive sensor including the electrode surface is used as the contact sensor, and forming the part of the electrode surface in the reduced contact sensitivity part into the non-conductive part enables the contact sensitivity at the conductive part including the part of the electrode surface to be reduced.

Here, the reduced contact sensitivity part may be partially formed in a cross-section in a direction intersecting with the circumferential direction of the rim portion in a front view of the steering wheel.

In this manner, the reduced contact sensitivity part is partially formed in the cross-section of the rim portion, and a normal contact sensitivity area is partially left. Thus, for example, in a case where the reduced contact sensitivity part is disposed in the steering wheel adjacent to the outside in the radial direction, the contact from the outside in the radial direction of the steering wheel is not reacted while the contact with the part using the hands can be detected.

The electrode surface may be conductive paint applied on an outer surface of the rim portion of the steering wheel or a conductive sheet covering the outer surface of the rim portion of the steering wheel. The non-conductive part is preferably a non-applied part on which the conductive paint is not applied or a notch in the conductive sheet.

In this manner, in a case where the electrode surface is a paint applied surface on which the conductive paint is applied (or the conductive sheet), making a part of the electrode surface into the non-applied part (or the notch) can simply and easily reduce the detection sensitivity of the capacitance compared with the paint applied part (or the part without the notch).

According to the present invention, the contact sensitivity in the region of the rim portion of the steering wheel adjacent to the seating surface of the driver's seat when the vehicle is traveling straight is lower than the contact sensitivity in the remaining region of the rim portion. Thus, even when the abdominal part or the femoral part in the lower limb of the obese person comes into contact with the reduced contact sensitivity part serving as the region with low contact sensitivity, the value of a contact signal does not exceed the threshold, and false detection that the occupant is in contact with the steering wheel is avoided. On the other hand, the threshold can be set such that the value of the contact signal exceeds the threshold when the occupant grips the reduced contact sensitivity part serving as the region with low contact sensitivity with their hands. Thus, it can be reliably detected that their hands are in contact or not in contact with the steering wheel.

DESCRIPTION OF EMBODIMENT

A preferred embodiment of a steering wheel unit according to the present invention will be described in detail below with reference to the accompanying drawings.

Structure

Figure 1:
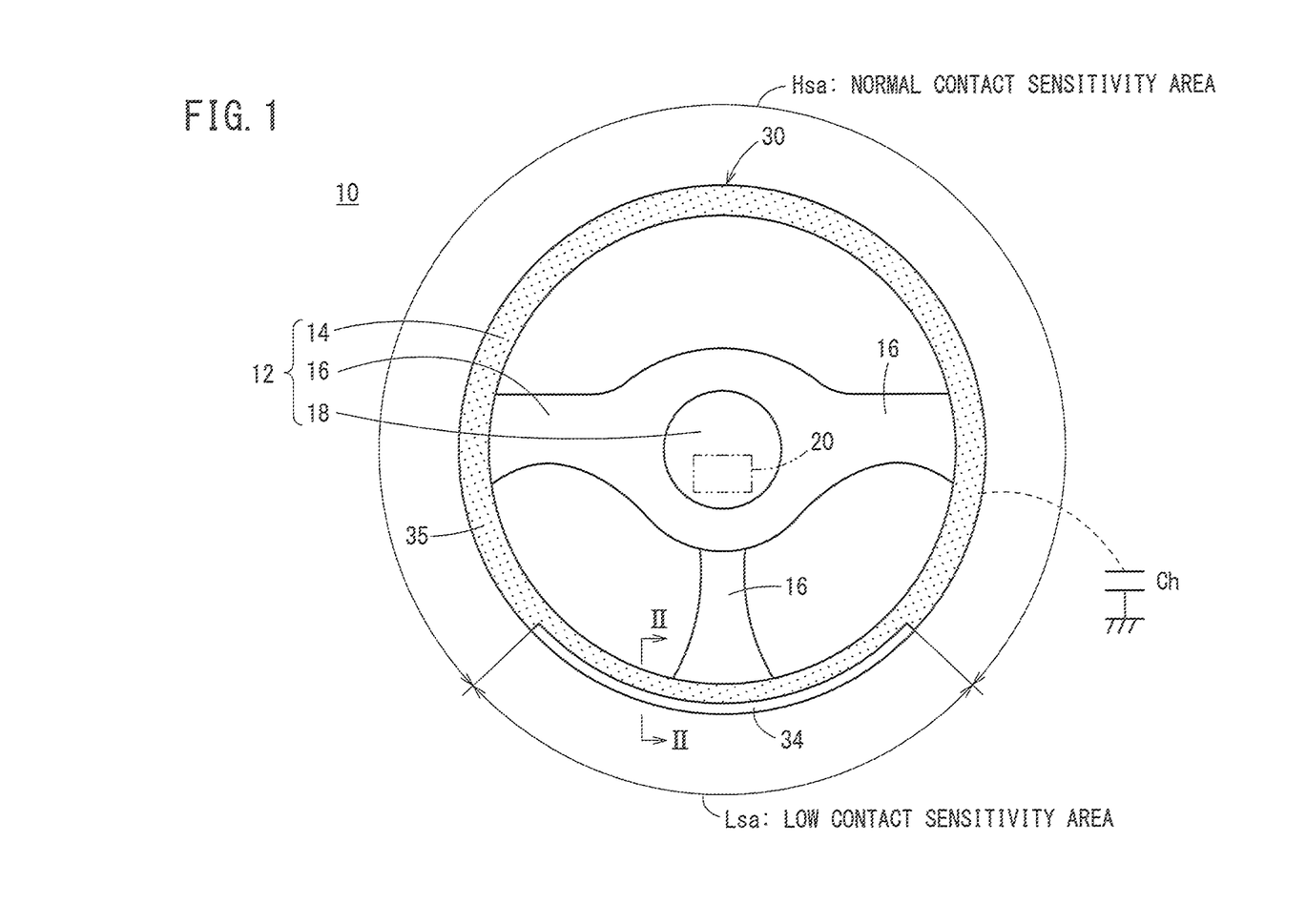
FIG. 1 is a schematic outside view illustrating the front structure of a steering wheel unit according to an embodiment.

FIG. 1 is a schematic outside view illustrating the front structure of a steering wheel unit 10 according to the embodiment.

Figure 2:
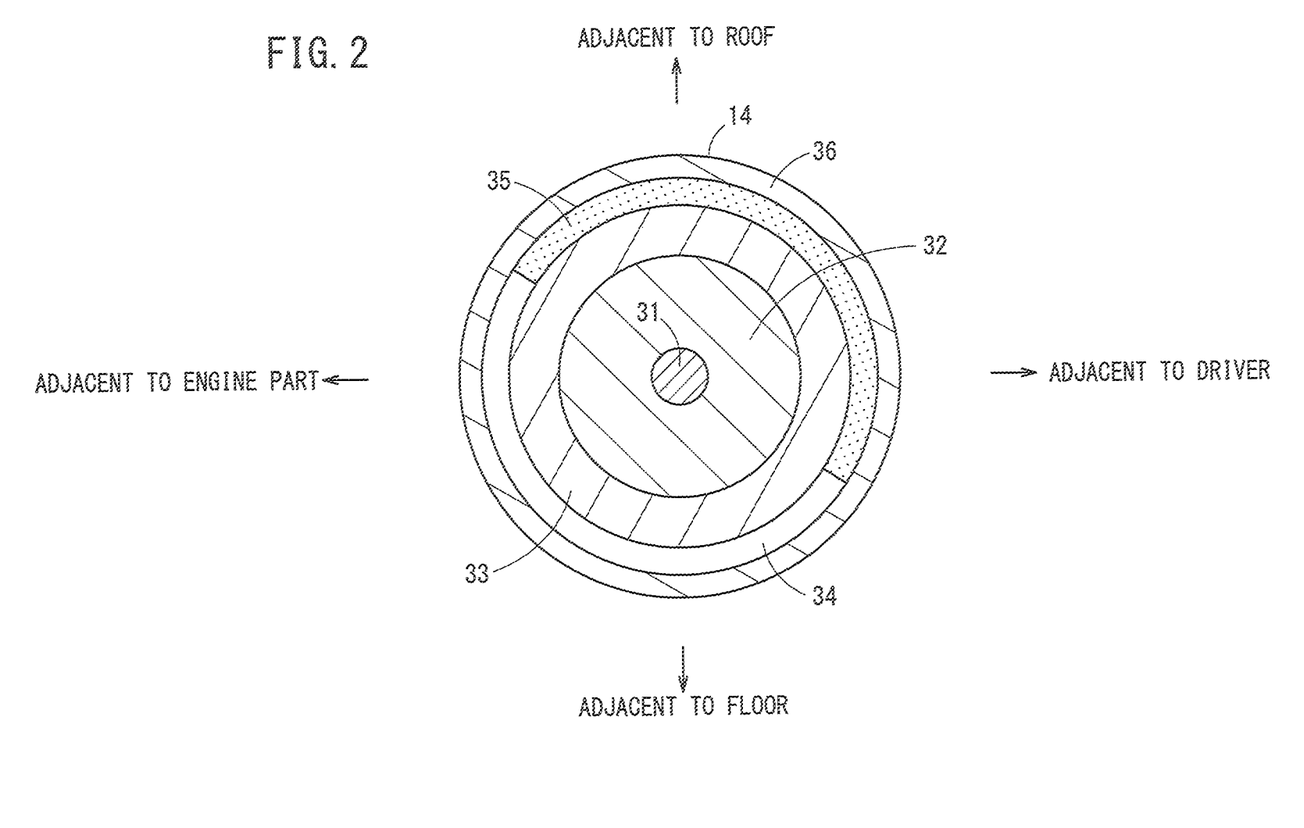
FIG. 2 is a schematic cross-sectional view of a rim portion of the steering wheel unit illustrated in FIG. 1 taken along line II-II.

FIG. 2 is a schematic cross-sectional view of a rim portion 14 of the steering wheel unit 10 illustrated in FIG. 1 taken along line II-II.

Figure 3:
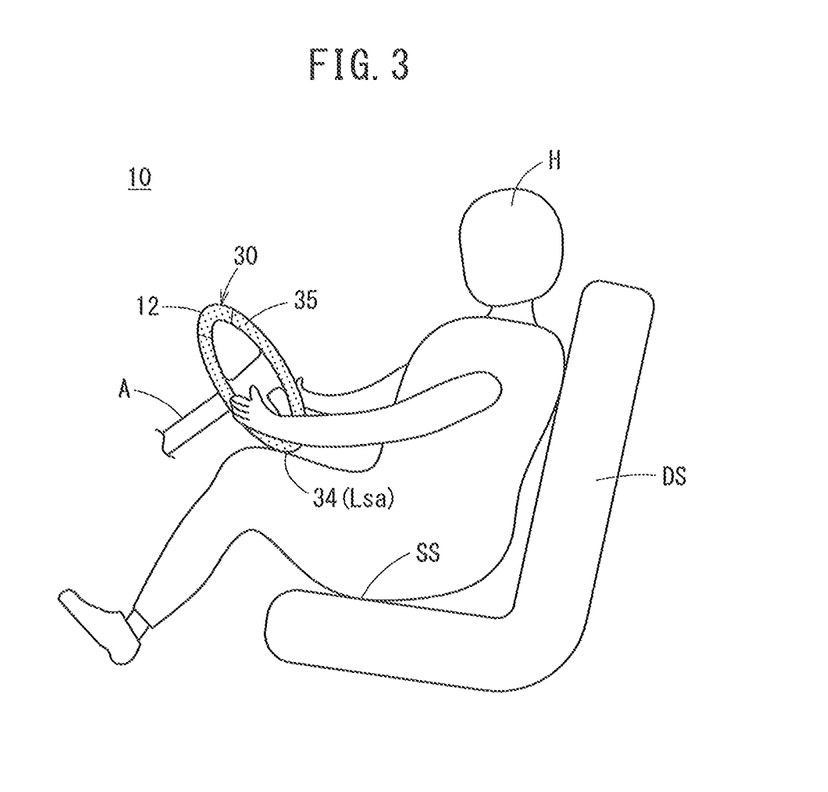
FIG. 3 is a conceptual diagram illustrating an obese person serving as an occupant sitting on the seating surface of the driver's seat.

FIG. 3 is a conceptual diagram illustrating an obese person serving as an occupant H sitting on the seating surface SS of the driver's seat DS.

In FIGS. 1 and 3, the steering wheel unit 10 includes a steering wheel 12 the occupant H operates to steer.

The steering wheel 12 has an annular shape and includes the rim portion 14 the occupant (driver) H grips (comes into contact with) with his/her hands, spoke portions 16 connecting the left, right, and bottom parts, the parts being located at the positions when the vehicle is traveling straight, of the rim portion 14, and a hub portion 18 connected to a steering shaft A (see FIG. 3).

A determining circuit (contact determining circuit) 20 comprised of an ECU (Electronic Control Unit) is disposed inside the hub portion 18.

The rim portion 14 is provided with a contact sensor 30. In the cross-sectional view in FIG. 2, the upper side is adjacent to the roof, the right side is adjacent to the occupant (driver) H, the left side is adjacent to an engine part including an engine, a motor, and the like, and the lower side is adjacent to the floor.

The cross-section of the rim portion 14 in the axial direction of the steering wheel 12 has a layered structure including a plurality of layers.

As illustrated in FIG. 2, for example, the rim portion 14 includes an annular cored bar 31, a base 32 comprised of a resin member, a leather member 33, a conductive part 35 part of which is an empty part 34 (mixed part of the conductive part and the empty part), and a protective film 36 coating the entire base 32 including the conductive part 35 (part exclusive to the conductive part).

The cored bar 31 serves as the framework of the rim portion 14. The base 32, having a substantially circular cross-section, covers the entire surface of the cored bar 31 with a sufficient thickness, and defines the general shape of the rim portion 14. The leather member 33 covers the entire surface of the base 32.

The conductive part 35 is formed by applying conductive paint onto the leather member 33 to cover the outer surface of the leather member 33, in other words, the entire surface of the rim portion 14 except for the empty part 34.

In practice, the empty part 34 is a non-applied part, and there is almost no gap between the leather member 33 and the protective film 36.

The conductive part 35 functions as the contact sensor 30. The protective film 36 does not reduce the conductivity.

The conductive part 35 functioning as the contact sensor 30 may be a conductive sheet. In a case where the conductive sheet is used, a cut-off part or a notch serves as the empty part 34.

As illustrated in FIGS. 1 and 3, the empty part 34 is located adjacent to the lower end of the steering wheel 12 when the vehicle is traveling straight. The area of the conductive part 35 including the empty part 34 (mixed part of the conductive part and the empty part; also referred to as "predetermined region" or "predetermined area") is formed in a low contact sensitivity area Lsa (reduced contact sensitivity part), and the area of the conductive part 35 not including the empty part 34 (part exclusive to the conductive part) is formed in a normal contact sensitivity area Hsa. Considering that capacitance is in proportion to the area (contact area) between the surface of the body of the occupant H and the contact sensor 30, the contact sensitivity here refers to capacitance [pF] created per unit contact area [mm$^2$]. Thus, the value of a contact signal St' (see FIG. 4) output from the contact sensor 30 corresponds to the contact area [mm$^2$]×the contact sensitivity [pF/mm$^2$]=the capacitance [pF] according to the contact area.

The example in FIG. 3 illustrates a state where a femoral part in the lower limb of the occupant H as the obese person is in contact with the low contact sensitivity area Lsa including the empty part 34. In this state, the femoral part is in contact mainly with the empty part 34 and has little contact with the conductive part 35.

Figure 4:
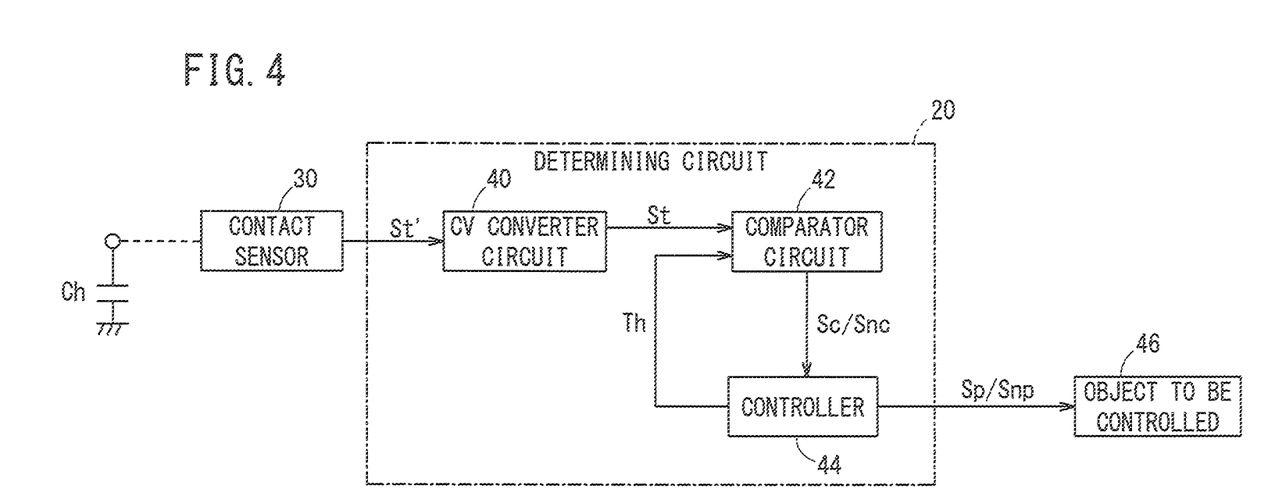
FIG. 4 is a circuit block diagram of the steering wheel unit illustrated in FIG. 1.

FIG. 4 is a circuit block diagram of the steering wheel unit 10.

The contact sensor 30 also functioning as an electrode (electrode surface) is electrically connected with the determining circuit 20.

The contact sensor 30 is basically a capacitive sensor configured to detect capacitance Ch [pF] between the hands of the occupant H gripping (in contact with) the steering wheel 12 and the electrode as the contact signal St' [pF].

The contact signal St' is input to a CV converter circuit 40 constituting the determining circuit 20 as an input signal.

The CV converter circuit 40 utilizes a known integrating circuit ([0015] in JP 2015-147531 A), charge transfer technology, or the like, and converts a contact signal St corresponding to (indicating) the capacitance Ch into the contact signal St in voltage [V] to output.

The contact signal St is input to an input terminal, for comparison, of a comparator circuit 42.

An input terminal, for reference, of the comparator circuit 42 has a threshold Th set by a controller 44.

The comparator circuit 42 outputs a contact indicator signal Sc serving as a comparison result to the controller 44 when St≥Th, and outputs a no-contact indicator signal Snc to the controller 44 when St<Th.

The controller 44 sends a control permission signal Sp in response to the contact indicator signal Sc or a control rejection signal (signal not permitting control) Snp in response to the no-contact indicator signal Snc to an object 46 to be controlled including devices for entertainment such as navigation systems and devices for traveling such as LKASs.

In addition to the navigation systems, the devices for entertainment may include, for example, audiovisual systems. In addition to the LKASs, the devices for traveling include, for example, adaptive cruise control systems (self-driving (including self-driving assist) systems such as ACC (Adaptive Cruise Control) systems).

Figure 5:
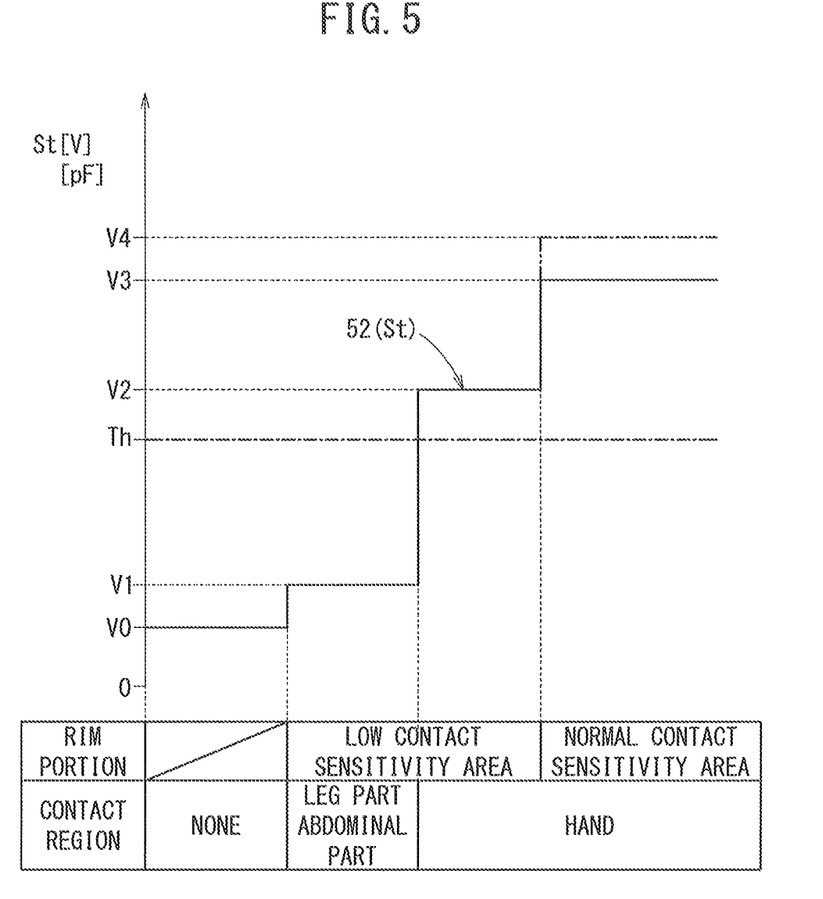
FIG. 5 is a characteristic diagram illustrating the correspondent relationship between a contact region of the occupant in contact with the steering wheel and a contact signal.

FIG. 5 illustrates a characteristic 52 of the contact signal St indicating the capacitance Ch generated according to the contact region (manner of contact) of the occupant H in contact with the rim portion 14 (including the low contact sensitivity area Lsa and the normal contact sensitivity area Hsa) of the steering wheel 12.

The characteristic 52 indicates that, when the occupant H is not in contact with the rim portion 14, that is, the contact sensor 30 at all, the value of contact signal St is voltage V0 (St=V0) corresponding to stray capacitance.

When a leg part or an abdominal part of the occupant H is in contact mainly with the empty part 34 (mixed part of the conductive part and the empty part) in the low contact sensitivity area Lsa, the value of the contact signal St is voltage V1 (St=V1).

When both hands of the occupant H grip the low contact sensitivity area Lsa (for example, in a case where the occupant H grips the rim portion 14 between the right spoke portion 16 and the lower spoke portion 16 with the right hand and grips the rim portion 14 between the left spoke portion 16 and the lower spoke portion 16 with the left hand, that is, in a case of a grip on so-called 8:20 position, which indicating positons of hands of a clock at 8:20), in other words, when the occupant H grips the empty part 34 and the conductive part 35 at the same time, the value of the contact signal St is voltage V2 (St=V2) that is significantly higher than the voltage V1 when only the femoral part is in contact with the low contact sensitivity area Lsa.

When both hands of the occupant H grip the normal contact sensitivity area Hsa, that is, only the conductive part 35 (part exclusive to the conductive part), in other words, when the occupant H grips positions indicating approximately 10:10 or 9:15, the value of the contact signal St is voltage V3 (St=V3), which is even higher.

Voltage V4 indicated by long dashed double-short dashed lines indicates the voltage of the contact signal St {St=V4≈V3+(V1−V0)} when the leg part or the abdominal part of the occupant H is in contact with the low contact sensitivity area Lsa (mixed part of the conductive part and the empty part) and, at the same time, both hands of the occupant H grip the normal contact sensitivity area Hsa (part exclusive to the conductive part).

As illustrated in FIG. 4, the comparator circuit 42 constituting the determining circuit 20 compares the contact signal St indicating the capacitance Ch as a value to be compared and the threshold Th (see FIG. 5, V1<Th<V2) as a reference value, determines that the hands are in contact with the steering wheel (the hands grip the steering wheel 12) when St≥Th (when St=V2, V3, or V4), and outputs the contact indicator signal Sc. On the other hand, when St<Th (St=V1 or V0), the comparator circuit 42 determines that the hands are not in contact with the steering wheel and outputs the no-contact indicator signal Snc to the controller 44.

The controller 44 sends the control permission signal Sp to the object 46 to be controlled in response to the contact indicator signal Sc or sends the control rejection signal Snp to the object 46 to be controlled in response to the no-contact indicator signal Snc.

The object 46 to be controlled, for example, (the ECU of) the device for entertainment having received the control permission signal Sp according to the contact signal St from the controller 44, allows the navigation system and the like to be used (in this case, as a result, operated by an occupant other than the occupant (driver) H who is determined as gripping the steering wheel 12), and also allows the LKAS and the like to be controlled (if being controlled, to be kept controlled).

On the other hand, the object 46 to be controlled having received the control rejection signal Snp according to the no-contact indicator signal Snc from the controller 44 determines that the occupant (driver) H does not grip the steering wheel 12, and rejects the use and the control (continuous control) of the object 46 to be controlled.

Operation

Next, the operation of the steering wheel unit 10 according to the embodiment basically configured as above will be described in detail based on the flowchart illustrated in FIG. 6. Unless otherwise specified, the CPU of the determining circuit 20 executes processes in the flowchart (program) and will be referred to as required to avoid complexity caused by referring every time.

Figure 6:
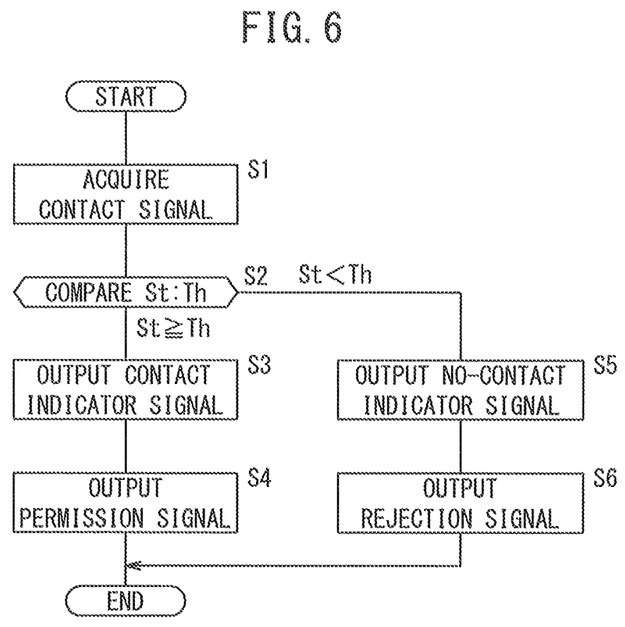
FIG. 6 is a flowchart illustrating the operation of the steering wheel unit according to the embodiment.

The flowchart illustrated in FIG. 6 is repeated, for example, every few milliseconds to tens of milliseconds.

In step S1, the determining circuit 20 acquires the contact signal St from the contact sensor 30 via the CV converter circuit 40.

In step S2, the comparator circuit 42 compares the value of the contact signal St and the threshold Th.

When the value of the contact signal St is greater than or equal to the threshold Th (St ≥Th), the comparator circuit 42 outputs the contact indicator signal Sc to the controller 44 in step S3. In this case, in step S4, the controller 44 of the determining circuit 20 sends the control permission signal Sp to the object 46 to be controlled.

On the other hand, when the value of the contact signal St is less than the threshold Th (St<Th) in step S2, the comparator circuit 42 outputs the no-contact indicator signal Snc to the controller 44 in step S5. In this case, in step S6, the controller 44 of the determining circuit 20 sends the control rejection signal Snp to the object 46 to be controlled.

CONCLUSION AND MODIFICATION

As described above, the steering wheel unit 10 according to the embodiment includes the contact sensor 30 configured to detect a grip on the rim portion 14 of the steering wheel 12 of the vehicle with the hands (serving as a part of the body) of the occupant H.

In this case, the contact sensitivity [pF/mm$^2$] of the contact sensor 30 in the region including the empty part 34 serving as the predetermined region of the rim portion 14 of the steering wheel 12 adjacent to the seating surface SS of the driver's seat DS when the vehicle is traveling straight (low contact sensitivity area Lsa) is lower than the contact sensitivity in the other region of the rim portion 14 (region not including the empty part 34 (normal contact sensitivity area Hsa), namely, the part exclusive to the conductive part).

In this manner, the contact sensitivity [pF/mm$^2$] in the region of the rim portion 14 of the steering wheel 12 including the empty part 34 adjacent to the seating surface SS of the driver's seat DS (low contact sensitivity area Lsa) when the vehicle is traveling straight is lower than the contact sensitivity in the other region of the rim portion 14 (region not including the empty part 34; normal contact sensitivity area Hsa). Thus, even when the abdominal part or the femoral part in the lower limb of the obese person is in contact with the empty part 34 serving as the predetermined region with low contact sensitivity, the value of the contact signal St (voltage) increases (becomes higher) to not more than St=V1 and does not exceed the threshold Th. As a result, false detection that the occupant H is in contact with the steering wheel is avoided.

On the other hand, when the occupant H grips the rim portion 14 in the region including the empty part 34 serving as the region with low contact sensitivity (mixed part of the conductive part and the empty part) using the hands, the value of the contact signal St increases to St=V2 and exceeds the threshold Th. This enables reliable detection that the hands are in contact with the steering wheel 12 (not no-contact).

When the vehicle is traveling straight, the predetermined region (mixed part of the conductive part and the empty part) is located adjacent to the lower end of the steering wheel 12. The abdominal part or the femoral part in the lower limb of the obese person may come into contact with the region while the vehicle is traveling straight. However, even when the abdominal part or the femoral part in the lower limb of the obese person comes into contact with the region, the value of the contact signal St is less than the threshold Th (V1<Th) since St=V1, and thus no false detection occurs.

Moreover, the contact sensor 30 is a capacitive sensor including the conductive part 35 as the electrode surface formed over the entire circumference in the circumferential direction of the rim portion 14 of the steering wheel 12. Since the conductive part 35 serving as the electrode surface is partially formed into the empty part 34 serving as a non-conductive part in the low contact sensitivity area Lsa serving as the predetermined region, the contact sensitivity in the region including the empty part 34 (mixed part of the conductive part and the empty part) can be reduced.

As described above, the reduced contact sensitivity part serving as the low contact sensitivity area Lsa is partially formed in the cross-section (see FIG. 2) in the direction intersecting with the circumferential direction of the rim portion 14 in the front view of the steering wheel 12.

That is, the low contact sensitivity area Lsa (reduced contact sensitivity part) is partially formed in the cross-section of the rim portion 14, and the normal contact sensitivity area Hsa is partially left. Thus, for example, in a case where the low contact sensitivity area Lsa (reduced contact sensitivity part) is disposed in the steering wheel 12 adjacent to the outside in the radial direction, the contact with the low contact sensitivity area Lsa (reduced contact sensitivity part) from the outside in the radial direction of the steering wheel 12 is not reacted while the contact with the low contact sensitivity area Lsa (reduced contact sensitivity part) using the hands can be detected.

The conductive part 35 serving as the electrode surface is the conductive paint applied on the outer surface of the rim portion 14 of the steering wheel 12 or the conductive sheet covering the outer surface of the rim portion 14 of the steering wheel 12, and the non-conductive part is the empty part 34 serving as the non-applied part on which the conductive paint is not applied or the notch in the conductive sheet. That is, in a case where the electrode surface is the paint applied surface on which the conductive paint is applied or the conductive sheet, forming the notch in a part of the electrode surface can simply and easily reduce the contact sensitivity (detection sensitivity of capacitance) [pF/mm$^2$] compared with the part without the notch.

MODIFICATION

Figure 7:
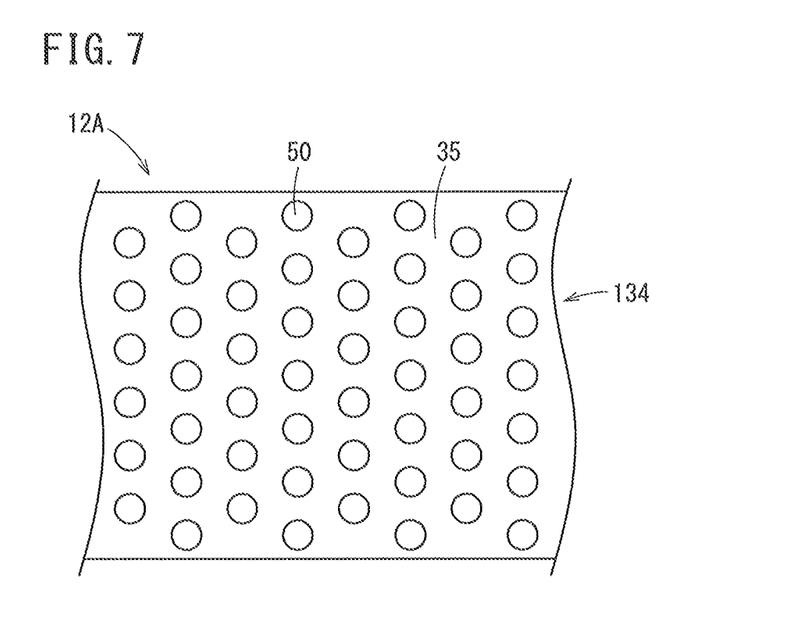
FIG. 7 is a schematic view illustrating a part of a steering wheel according to a modification.

The empty part 34 is not necessarily the notch with a relatively large area as illustrated in FIGS. 1 and 2. As illustrated in FIG. 7, a steering wheel 12A may include a perforated part 134 (mixed part of the conductive part and the empty part) formed by cutting a plurality of dots 50 with a small diameter out of the conductive part 35. The perforated part 134 may also be formed by applying paint or using a sheet.

Figure 8:
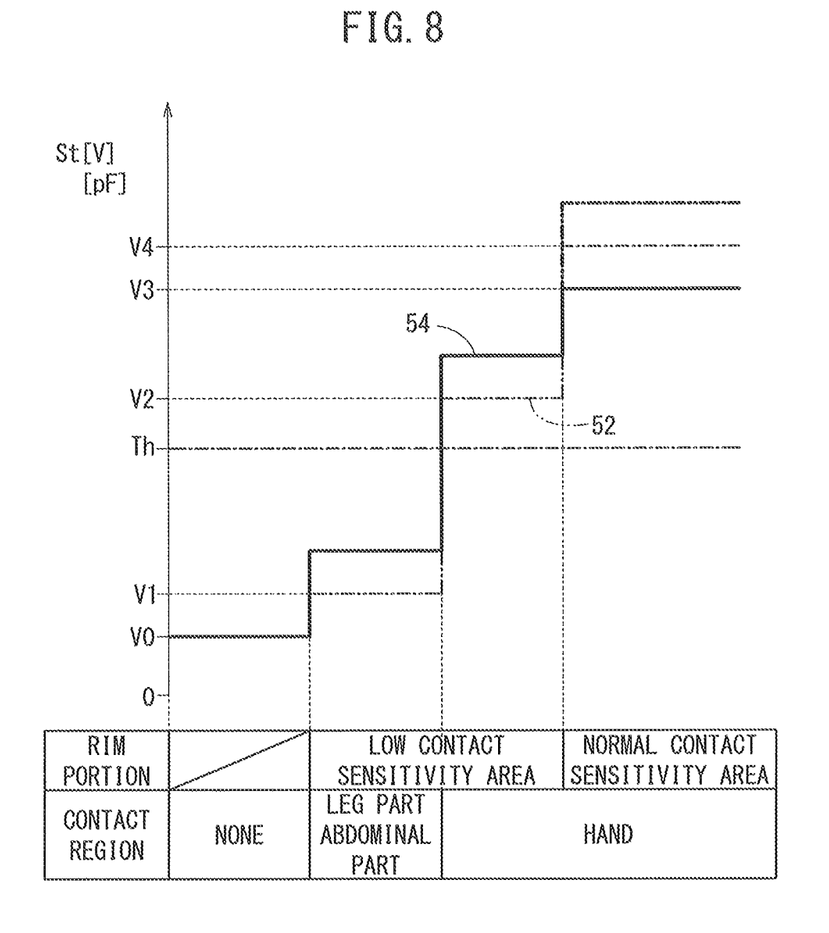
FIG. 8 is a characteristic diagram illustrating the correspondent relationship between the contact region of the occupant in contact with the steering wheel according to the modification and the contact signal.

FIG. 8 illustrates a characteristic 54 of the contact signal St indicating the capacitance Ch generated according to the contact region (manner of contact) of the occupant H with the rim portion 14 (including the low contact sensitivity area Lsa and the normal contact sensitivity area Hsa) of the steering wheel 12A including the perforated part 134. The value of the contact signal St is high compared with the original characteristic 52 part of which is indicated by thin long dashed double-short dashed lines. The threshold Th may be higher accordingly.

The present invention is not limited in particular to the above-described embodiment, and various structures can be adopted based on the contents of the description as a matter of course.

DESCRIPTION OF REFERENCE NUMERALS

10: steering wheel unit
12, 12A: steering wheel
14: rim portion
20: determining circuit
30: contact sensor
34: empty part
35: conductive part
Hsa: normal contact sensitivity area
Lsa: low contact sensitivity area

The invention claimed is:

1. A steering wheel unit comprising a contact sensor configured to detect contact of an occupant with a rim portion of a steering wheel of a vehicle,
wherein the contact sensor includes a reduced contact sensitivity part in a region of the rim portion of the steering wheel adjacent to a seating surface of a driver's seat when the vehicle is traveling straight, a contact sensitivity of the reduced contact sensitivity part being lower than a contact sensitivity in a remaining region of the rim portion, the contact sensor is a capacitive sensor including a conductive part as an electrode surface formed in a circumferential direction of the rim portion of the steering wheel, and part of the electrode surface in the reduced contact sensitivity part is formed into a non-conductive part, the reduced contact sensitivity part is partially formed in a cross-section in a direction intersecting with the circumferential direction of the rim portion in a front view of the steering wheel, the contact sensor includes the reduced contact sensitivity part at a lower end of the steering wheel when the vehicle is traveling straight, the reduced contact sensitivity part including a mixed part of the conductive part and the empty part as the non-conductive part disposed in an outer part of the rim portion in a radial direction, and the contact sensor includes a part exclusive to the conductive part disposed in an inner part of the rim portion in the radial direction, the part exclusive to the conductive part excluding the empty part as the non-conductive part in the electrode surface.

2. The steering wheel unit according to claim 1, wherein the reduced contact sensitivity part is a region located adjacent to a lower end of the steering wheel when the vehicle is traveling straight.

3. The steering wheel unit according to claim 1, wherein the electrode surface is conductive paint applied on an outer surface of the rim portion of the steering wheel or a conductive sheet covering the outer surface of the rim portion of the steering wheel, and the non-conductive part is a non-applied part on which the conductive paint is not applied or a notch in the conductive sheet.

* * * * *